United States Patent [19]
Joyce

[11] 3,831,737
[45] Aug. 27, 1974

[54] DECORATOR LOADING APPARATUS

[75] Inventor: Arthur W. Joyce, Framingham, Mass.

[73] Assignee: Dennison Manufacturing Company, Framingham, Mass.

[22] Filed: July 27, 1972

[21] Appl. No.: 275,476

[52] U.S. Cl. .................................................. 198/57
[51] Int. Cl. ............................................ B65g 47/18
[58] Field of Search ............ 198/54, 56, 57, 58, 37; 221/160, 161, 162

[56] References Cited
UNITED STATES PATENTS
| | | | |
|---|---|---|---|
| 3,103,055 | 9/1963 | Ingham | 198/37 X |
| 3,204,334 | 9/1965 | Long et al. | 198/57 X |
| 3,513,962 | 5/1970 | Stone et al. | 198/57 |

Primary Examiner—Richard A. Schacher
Assistant Examiner—Douglas D. Watts
Attorney, Agent, or Firm—Donald Brown; Dike, Bronstein, Roberts & Cushman

[57] ABSTRACT

Decorator loading apparatus for loading tubes or the like into carriers. The loader includes a hopper into which the tubes are initially loaded and thereafter dispensed into tube carriers passing below the open bottom of the hopper. The tubes are either kicked vertically upwards against a deflector positioned in the hopper and deflected to the rear of the hopper or urged downwardly into a tube carrier moving below the hopper.

The above is accomplished by the use of a moving belt which preferably has a relatively high coefficient of friction and which acts on the tubes. In addition, sensor means is provided for detecting out of position tubes to turn off the apparatus to avoid jamming.

3 Claims, 7 Drawing Figures

DECORATOR LOADING APPARATUS

FIELD OF THE DISCLOSURE

The invention is related to a decorator loading apparatus for loading a tube into a carrier which is subsequently positioned at a station where the tube may be rammed on a mandrel or rod supported by a turret. The tube is then subsequently positioned at a labeling station where a label such as a heat transfer label may be applied to the tube. The apparatus of this disclosure finds particular utility in the labeling of plastic tubes conventionally used in the cosmetic and health industries and in a process wherein labels are transferred from a backing strip to the tube by the use of heat.

BACKGROUND OF THE DISCLOSURE

Heat transfer labeling systems have come into wide use over the past few years. Essentially, such systems include a conveyor for feeding means to be labeled, means for transferring the means to be labeled to a turret for positioning the said means to be labeled one at a time at a labeling station, a feed mechanism for transporting labels supported on a backing strip to the labeling station, and means for pressing the label against the means to be labeled to transfer a label thereto. Examples of such labeling systems are shown in U.S. Pat. Nos. 2,981,432, 3,036,624, 3,064,714, 3,208,897, 3,231,488 and 3,261,734. Label bearing strips for the above systems are also shown in U.S. Pat. No. 2,862,832.

The above systems have also come into wide use for labeling plastic tubes which are currently used in the cosmetic industry. Recently, there has been developed a feeding system for placing tubes or the like on a mandrel of a turret. Such a system has been disclosed in U.S. Pat. Application Ser. No. 134,844 filed Apr. 21, 1971, by Joseph T. Holovnia and Vitie S. Rakauskas and assigned to the same assignee as this patent application.

In order to facilitate the use of the loading apparatus disclosed in the aforementioned patent application, there has developed a need for a new and improved decorator tube loading hopper apparatus to reliably position tubes for feeding onto a turret.

In the prior used decorator hopper loading devices, jamming was an extreme problem and it was most difficult to operate the device for more than several minutes of running time between jams. This often necessitated machine repair and adjustment. It appeared that one of the major obstacles to reliable machine operation was the unstable dynamic characteristics of plastic tubes aggravated by surface condition of the tube as well as the build up of static electrical charges. Accordingly, a new and improved decorator hopper loading apparatus was required in order to smoothly and repetitively feed tubes into a carrier without the occurrence of numerous jams causing system break-down.

In the present invention it is now possible to decrease average running time between accidental hopper stoppages by a factor of about 10 or more. In addition, hopper jams causing machine damage have almost been completely eliminated.

BRIEF DESCRIPTION OF THE DISCLOSURE

The present disclosure provides a new and improved decorator hopper loading apparatus for feeding tubes or the like into an open carrier such that the tube will rest on its side. In the preferred construction of this disclosure tubes are fed into a hopper open at the bottom under which a plurality of tube carriers (closely spaced with respect to each other) are moved thereunder. The carriers are positioned such that tubes may move into the confines of the carrier.

In order to insure the controlled loading of the tubes, there is provided a rotating belt preferably having a high co-efficient of friction, e.g., of rubber having a portion thereof movable at one end of the hopper for either urging the tube to be loaded into the carrier or deflecting it upwardly before it can jam. To further prevent jamming a deflector is provided which is positioned in proximity to the moving belt so as to preferably elliptically deflect the tubes rearwardly if they can not be loaded. In addition, sensor means are provided for detecting if tubes are properly loaded within the carrier.

BRIEF DESCRIPTION OF THE DRAWINGS

FIG. 7 illustrates in more detail the front end of the decorator apparatus after the tubes have left the hopper apparatus so that they may be positioned and placed or rammed on a mandrel or the like.

DESCRIPTION OF THE PREFERRED EMBODIMENT

Figure 1:
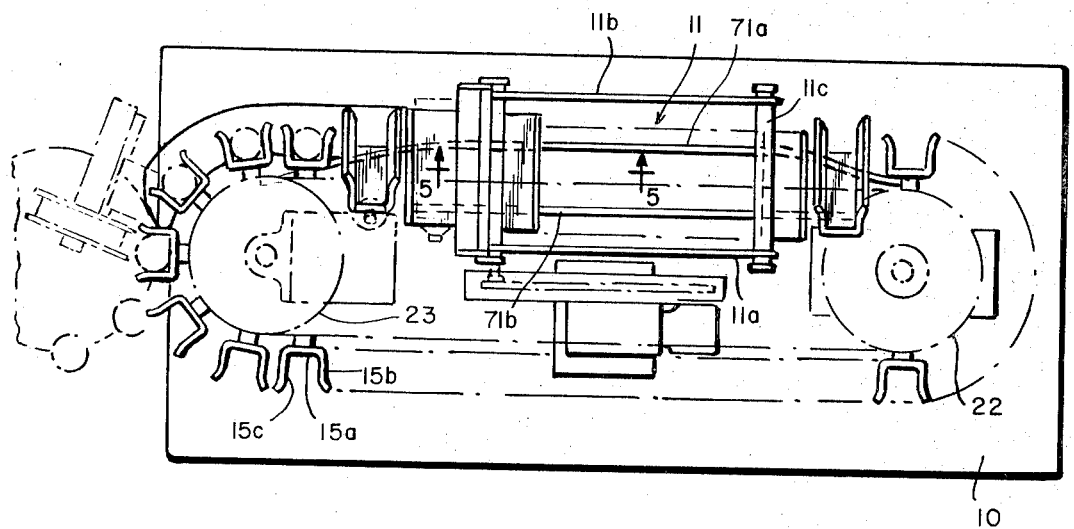
FIG. 1 is a top view illustrating the general configuration of the decorator hopper loading apparatus according to this invention.

Reference should now be had to FIGS. 1 to 7 for a description of the preferred embodiment of the disclosure. At 10 there is shown a machine base for supporting the operating parts of the hopper loading apparatus. Positioned above the base is a hopper 11 open at the top and bottom and having side walls 11a and 11b and an end wall 11c. The hopper is constructed to receive tubes 12 as shown. The hopper 11 also has a deflector 13 at its other end for rearwardly deflecting tubes towards the end wall 11c of the hopper as will more fully be disclosed below.

Figure 5:
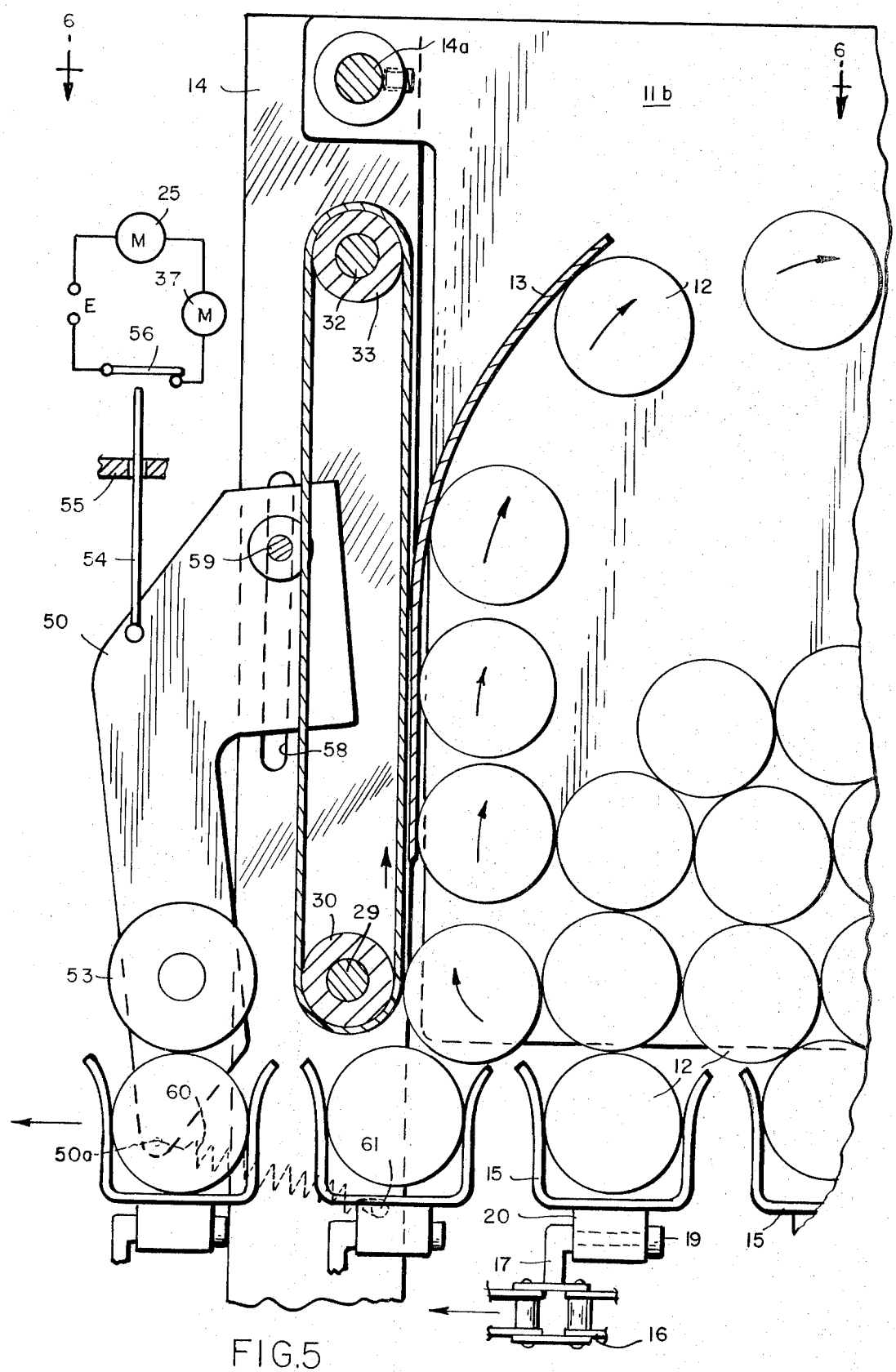
FIG. 5 illustrates in a large partial view the loading of tubes into the carriers showing a portion of the decorator hopper loading apparatus according to this invention.
Figure 6:
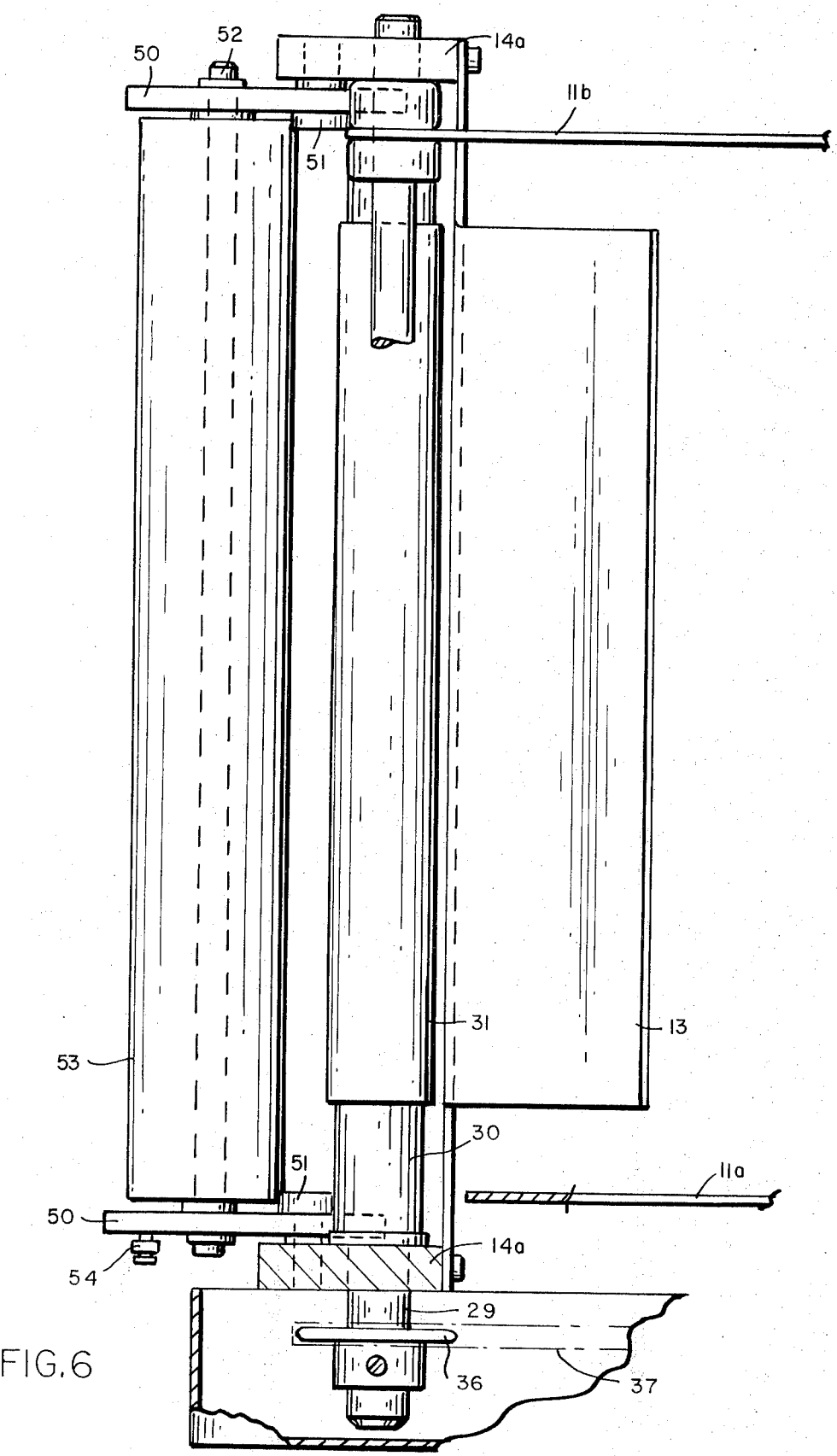
FIG. 6 illustrates a top view of the structure shown in FIG. 5.
Figure 7:
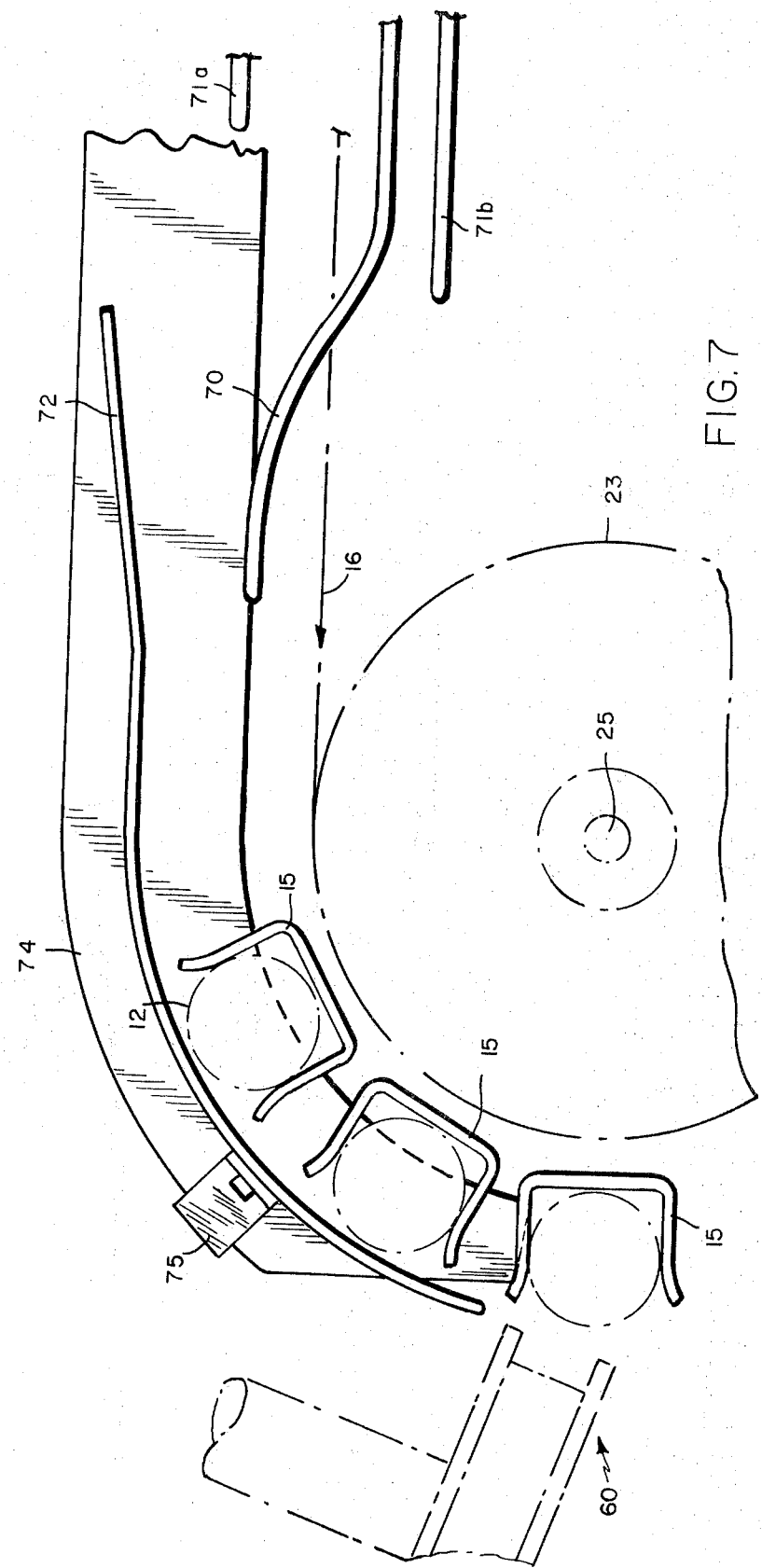

The hopper 11 as well as the deflector 13 is supported by legs 14a and 14b mounted on the base 10. At 15 there is shown one of a plurality of carriers for receiving tubes 12 exiting from the bottom of the hopper. The carriers as shown include a bottom 15a and two sides 15b and 15c. They are also preferably open at the top and the ends so that tubes 12 may position themselves therein as shown in FIG. 5.

The carriers 15 are pivotly supported by a chain 16 by members 17. Each carrier 15 is pivotly coupled to the members 17 via brackets 20 having a bore through which the members 17 extends. Each of the members 17 are provided with a nut 19 to retain carriers on the brackets 20.

The chain 16 is conventionally mounted on idler sprocket 22 and driven sprocket 23. Sprocket 23 is driven (rotated) by a motor 24 through a shaft 25 so that the carriers are moved in the path shown in FIG. 1.

At 29 there is shown a driven shaft supporting a roll 30 on which there is positioned a movable surface such as a belt 31. The belt 31 is preferably of a material such as a rubber having a sufficiently high coefficient of friction to enable it to kick or lift a plastic tube upwardly as shown by the arrows in FIG. 5 upon engagement therewith.

The belt 31 is also positioned over an idler roll 33 supported by a shaft 32. The shafts 29 and 32 are both supported in a conventional manner for rotation by the leg members 14a.

As may be seen in FIG. 5 a portion of the belt 31 is at the end of the hopper (that is the end at which each carrier 15 moves past last when traveling under the bottom of the hopper) and will upon engaging a tube propel it upwardly as shown by the arrows.

It may also be noted as shown in FIG. 5 that the carriers 15 are sufficiently close to prevent the tubes from falling between them and out of the hopper.

It should also be understood that as the carrier moves towards the left of FIG. 5, the layers of tubes 12 will be urged against the belt 31 to further aid in their being propelled upwardly.

The belt 31 also performs an additional function in that while rotating counterclockwise as shown by the arrow in FIG. 5, it will urge tubes 12 into alignment with the carriers' interior if they are slightly out of alignment after leaving the hopper.

The shaft 29 is driven by a conventional pulley system comprising pulleys 36 and 38, a belt 37 driven by a motor 39 through conventional gearing.

As another feature of this invention there is provided sensor means for detecting if the tubes are substantially out of alignment with the carrier holding them after leaving the hopper and passing under the belt 31.

In its preferred construction the sensor includes a support member 50 (coupled at 51 to the legs 14) which support for rotation a shaft 52. The shaft 52 supports a roll 53 in position to engage the tubes 12. The member 50 pivotly supports rod 54 having an L portion thereof positioned in a bore formed therein. The rod 54 will move with a member 55 to engage a switch 56 and open it in the event that a tube is sensed as being considerably above its desired position within the carrier. In this manner power is denied motors 25 and 37 to stop carrier motion and prevent machine damage.

The members 50 are pivotly supported at 59 in a conventional manner and is positionable (upward or downward) within a slot 58 formed in the legs 14. The roll 53 is resiliently biased or urged in a counterclockwise direction by the provision of a spring 60 connected between a pin 61 supported by legs 14 and a hole 50a formed in one of the members 50.

Figure 2:
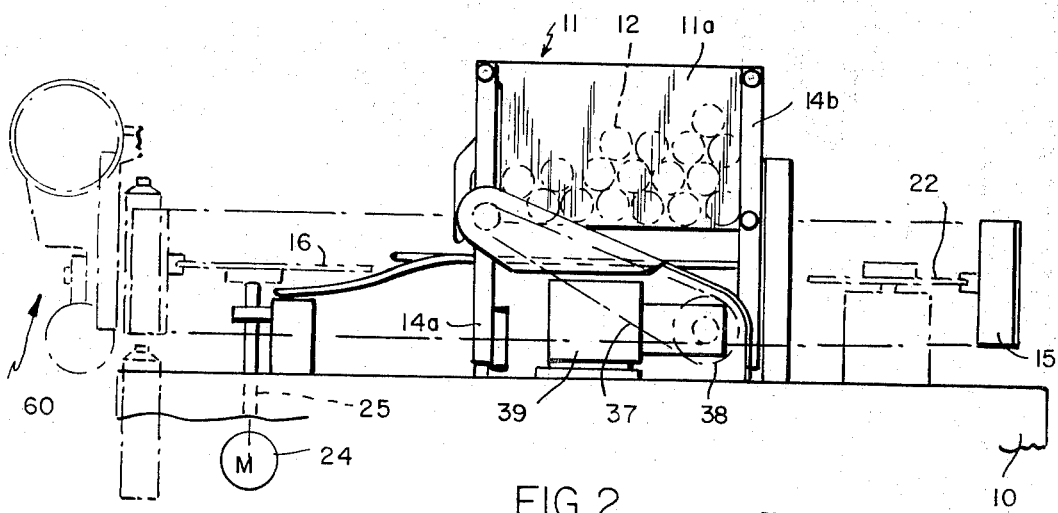
FIG. 2 is a view with parts removed of the apparatus shown in FIG. 1.
Figure 3:
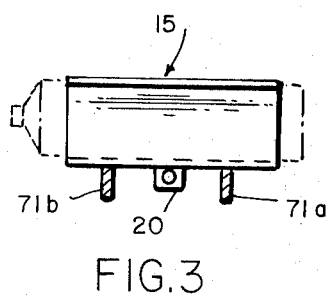
FIGS. 3 and 4 illustrate both front and side views of a tube positioned within a carrier.
Figure 4:
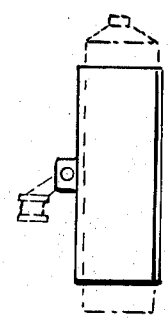

Reference should now be had briefly to FIGS. 1 and 2 for a brief description of the operation of the hopper apparatus of this invention. The carriers 15 are driven by the chain in a counterclockwise direction and are in a vertical position prior to then being positioned in location to receive tubes from the hopper 11. In order to orient the carriers 15 in a horizontal position prior to passing before the upstream end of the hopper, rails 71a and 71b (see FIGS. 1 and 7) are provided.

These rails slidably engage the bottom of the carriers to position them as shown in FIG. 5. After moving past the downstream end of the hopper, the carriers are rotated vertically by the provision of a rail 70 with the tubes 12 being held in place and within the carrier by a rail 72 and a shelf 74. After being vertically oriented the carriers are now in position for the rammer generally shown at 60 to function to force the tubes onto a mandrel of a turret (not shown) as disclosed in the aforementioned U.S. Pat. Application Ser. No. 135,844.

A search of the prior art was made based on the disclosure and the following U.S. Pats. were uncovered. U.S. Pat. Nos. 1,803,993, 2,965,263 and 3,627,105. No warranty is made that the most pertinent was uncovered.

I claim:

1. In a mechanism for positioning a tube or the like in location to be fed onto a turret, said mechanism comprising a hopper for holding a plurality of tubes, a plurality of tube carriers positioned to receive tubes exiting from the bottom of the hopper, means for moving the carrier below the bottom of the hopper to receive tubes exiting from the hopper, a movable surface means positioned at one end of the hopper to kick upwardly and out of the way tubes which have not entered the carriers, in which each carrier first travels below one end of the hopper and then passes by the second end of the hopper in which a portion of the movable surface means is positioned at the second end of the hopper in which first means is provided to deflect the tubes after being kicked to the end of the hopper furthest from the movable surface means in which the sensor means is provided to detect if the tubes are properly oriented within the carrier after they are carried from the hopper and in which said sensor means comprises a roll resiliently biased in a direction to engage tubes carried by the carriers.

2. In a mechanism according to claim 1 in which means is provided for stopping carrier motion in the event that misalignment is detected.

3. A loading hopper comprising a hopper open at the bottom for feeding tubes onto a plurality of tube carriers one at a time, a plurality of carriers, said carriers moving below the hopper bottom, a moving belt at one end of the hopper which engages tubes in the hopper to propel the tubes upwardly with respect to the carriers, means for moving the belt, deflecting means positioned to change the direction of tube motion so as to relocate the tubes within the hopper and in which sensor means is provided to detect if the tubes having the hopper in the carriers are improperly positioned with respect to the carriers and if so to stop the movement of the carriers, said sensor means comprises a roll resiliently biased in a direction to engage tubes carried by the carriers.

* * * * *